UNITED STATES PATENT OFFICE.

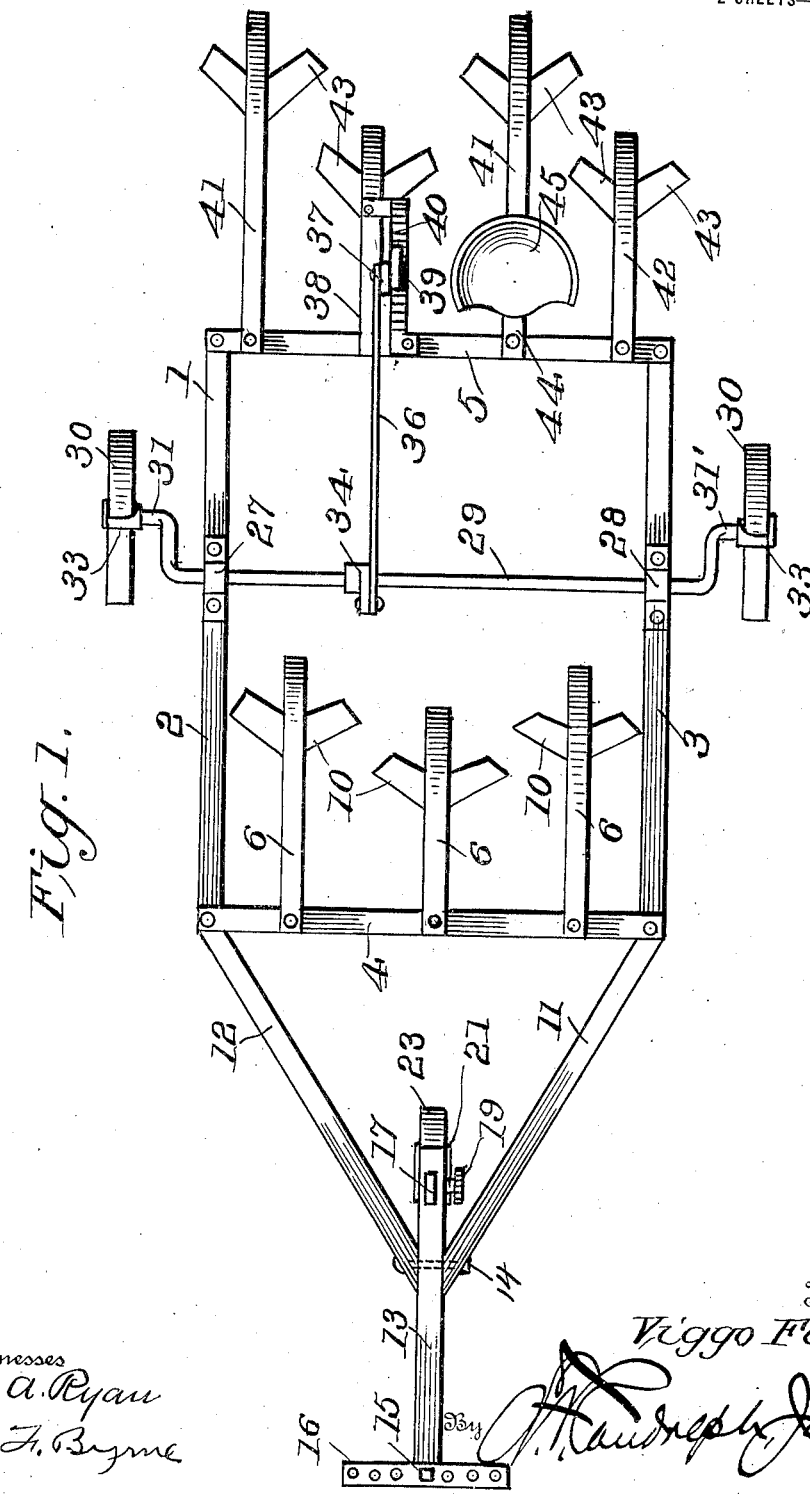

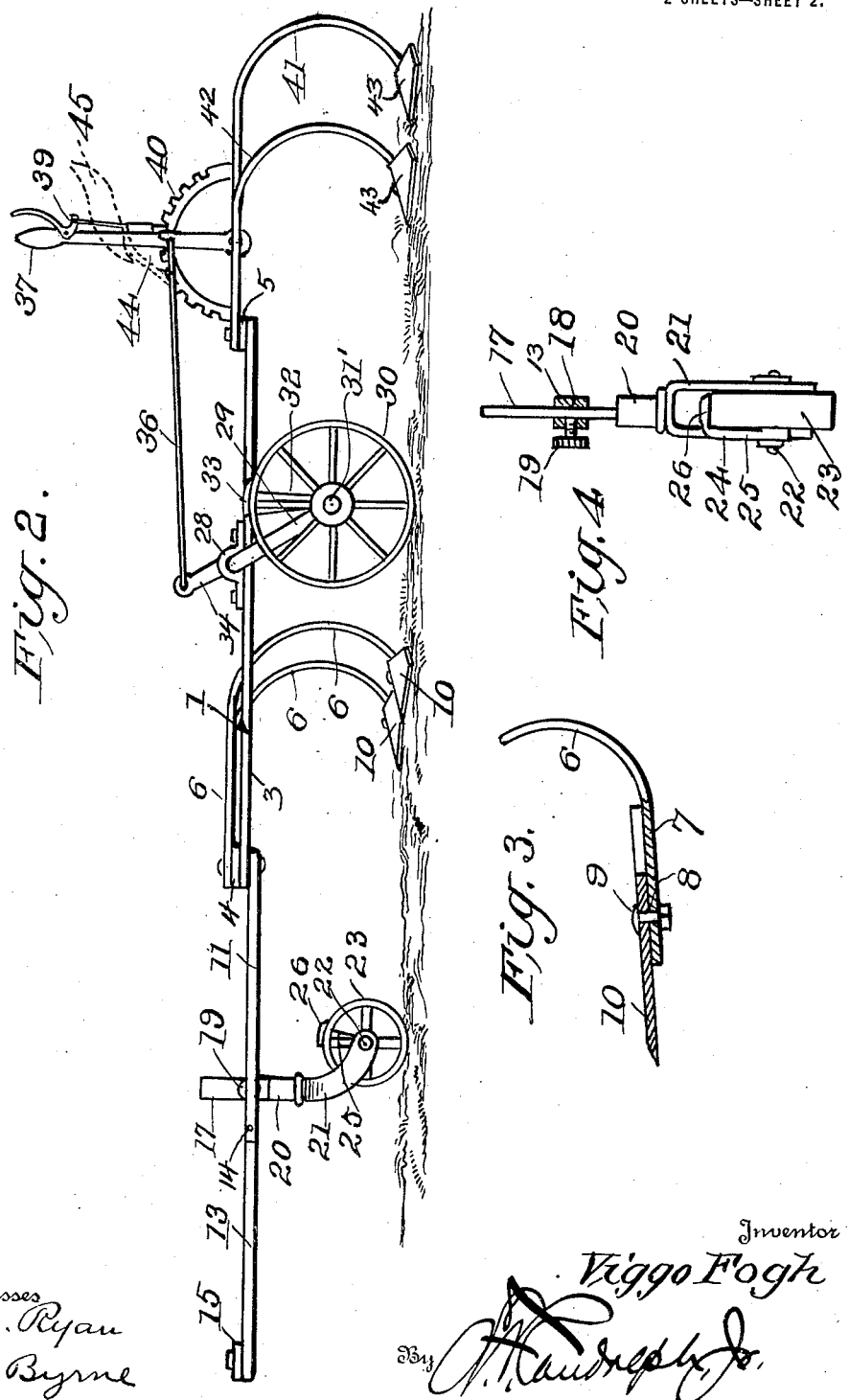

VIGGO FOGH, OF MILES CITY, MONTANA.

HARROW.

1,341,365.　　　　　　Specification of Letters Patent.　　Patented May 25, 1920.

Application filed October 13, 1916. Serial No. 125,394.

*To all whom it may concern:*

Be it known that I, VIGGO FOGH, a citizen of the United States, residing at Miles City, in the county of Custer and State of Montana, have invented certain new and useful Improvements in Harrows; and I do hereby declare the following to be a full, clear, and exact description of the invention, such as will enable others skilled in the art to which it appertains to make and use the same.

This invention relates to harrows and the primary object of the invention is the provision of a substantially rectangular shaped harrow frame which has a plurality of shovel or tooth carrying beams detachably secured thereto and extending downwardly therefrom, and also a crank axle which supports traction wheels, and means for rocking said axle for moving said wheels into or out of engagement with the surface of the ground over which the harrow is traveling.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a plan view of the improved harrow.

Fig. 2 is a side elevation of the harrow.

Fig. 3 is a detail sectional view of the lower terminal end of one of the shovel carrying arms showing the same in section, and showing a shovel attached thereto, and Fig. 4 is a detail view partially in section of the forward auxiliary frame and the swiveled traction wheel.

Referring more particularly to the drawings, 1 designates a rectangular frame which is composed of sides 2 and 3 and end rails 4 and 5, which are connected at their terminals for forming a substantially rectangular frame. The forward cross rail 4 has secured thereto a plurality of shovel carrying arms 6, which have their upper ends positioned substantially parallel with the surfaces of the side and end rails, and which are further curved downwardly as is clearly shown in Fig. 2 of the drawings, for positioning their shovel carrying ends 7 rearwardly of and beneath the forward cross rail 4 as is clearly shown in Fig. 2 of the drawings. The shovel carrying arms 6 have openings 8 provided in their ends 7, through which are inserted bolts 9 for attaching shovel blades or sweep blades 10 thereto. The shovel or sweep blades 10 are detachably connected to the shovel carrying arms so that they may be interchanged as is necessary for different uses. The arms 6 which are positioned adjacent to the side rails 2 and 3 are of greater length than the arm 6 which is positioned intermediate thereof, so that the sweep or shovel blades 10 carried thereby will be positioned rearwardly of the sweep or shovel carried by the middle or intermediate arm 6.

The side rails 2 and 3 have secured to their forward ends bars 11 and 12 which extend forwardly therefrom and converge at their forward end, for supporting a stub or auxiliary tongue 13. The auxiliary tongue 13 is secured to the forward converging ends of the bars 11 and 12 in any suitable manner, such as by bolt or other suitable fastening means 14 which extend through the converging ends of the arms and through the auxiliary tongue as is clearly shown in Fig. 1 of the drawings. The auxiliary tongue 13 has a cross bar 15 secured to its forward end which is provided with a plurality of longitudinally spaced openings 16. The openings 16 are provided for receiving a clevis (not shown) for attaching double and swingletrees (not shown) to the harrow for drawing the same over the ground.

The stub or auxiliary tongue 13 extends rearwardly from the converging ends of the arms 11 and 12 and it has a pin or bar 17 inserted through an opening 18 formed therein. The bar 17 is substantially rectangular in cross section and it is held in various adjusted positions within the opening 18 by a set screw 19 which is inserted through a transverse opening in the rearwardly extending end of the stub tongue 13 and engages the side of the bar 17 as is clearly shown in Fig. 4 of the drawings for holding this bar in various vertically adjusted positions within the slot or opening 18.

The bar 17 has a bearing 20 secured to its lower end, which swivelly supports a fork 21. The fork 21 has an axle 22 rotatably supported by the lower ends of the arms thereon, upon which axle is mounted a wheel 23. The fork 21 has formed thereupon a scraper 24, which embodies an arm 25 which extends outwardly at an incline from one of the arms of the bar 21 and which has a transversely disposed scraping blade 26 formed integrally therewith and positioned for engagement with the periphery of the wheel 23 for scraping dirt therefrom during the rotation of the wheel.

The side rails 2 and 3 of the frame 1 have bearings 27 and 28 detachably mounted thereupon, in which bearings is rotatably seated a crank or U-axle 29. The U-axle 29 has traction wheels 30 mounted upon the spindles 31 and 31' thereof. The spindles 31 and 31' have attached thereto scraping members which comprise vertically extending arms 32 and transversely or horizontally extending scraping blades 33 which engage the periphery of the traction wheels 30 and serve functions analogous with the scraping blade 26.

The axle 29 has secured thereto intermediate of the side rails 2 and 3 of the frame 1 a crank arm 34, which extends upwardly at an angle from the frame 1 and has a rod 36 loosely connected to its upper terminal end. The rod 36 extends rearwardly along the frame 1 and is connected to a hand lever 37. The hand lever 37 is pivotally carried by a shovel carrying arm 38 secured to the rear cross rail 5 of the frame 1. The lever 37 has a dog mechanism 39 carried thereby which coacts with a quadrant 40 for holding the lever in various adjusted positions, for raising or lowering the traction wheels 30 into or out of engagement with the surface of the ground over which the harrow is traveling. The quadrant 40 is supported by the rear rail 5 and the shovel carrying arm 38 as is clearly shown in Fig. 1 of the drawings.

The rear cross rail 5 of the supporting frame 1 has a plurality of shovel carrying arms 41 secured thereto, which arms are of greater length than the arm 38 and the arm 42, the latter arms being of equal length. The arms 38, 41 and 42 have their rear portions arcuate so that the shovel or sweep blades 43 which are carried thereby will be positioned rearwardly of and below the cross rail 5, and practically in a plane parallel with the shovel blades 10 carried by the arm 6. The arms 38, 41 and 42 are arranged in staggered relation with each other so that the shovels 43 carried by the arms 38 and 42 will be in alinement with each other, while the shovel blades carried by the arms 41 will be positioned rearwardly thereof and in alinement with each other as is clearly shown in Fig. 1 of the drawings. These arms are further connected to the rear cross rail 5 so that the shovels carried thereby will not travel in a line with the shovels 10 which are carried by the arm 6.

The rear cross rail 5 of the harrow has a flat spring 44 secured thereto which extends rearwardly and upwardly therefrom. The flat spring 44 supports a seat 45, which is positioned so that access to the lever 37 may be conveniently gained by a person riding thereupon.

In the operation of the improved harrow: when it is desired to transport the harrow from place to place, the lever 37 is operated, for rocking the U-axle 29, and causing the traction wheel 30 to engage the surface of the ground over which the harrow travels. The axle is rocked, so that when the wheels 30 are moved for engagement with the ground, they will elevate the frame and the shovel or sweep blades 10 and 43 causing the shovel or sweep blades to be out of engagement with the surface of the ground. When it is desired to use the harrow for the purpose of preparing or cultivating soil, the lever 37 is rocked for raising the traction wheels 30 so as to permit the shovel or sweep blades 10 and 43 to engage and insert into the ground over which it is traveling for the purpose of cultivating or preparing the soil for a seed bed. The wheel 23 being swivelly suported substantially intermediate of the side rails 2 and 3 and forwardly therefrom will permit comparatively sharp turning of the harrow, this wheel sliding around upon its swivel connection, instead of dragging as would be the case when a nonswiveled wheel is provided.

From the foregoing description taken in connection with the accompanying drawings the advantages of construction and of the method of operation of the improved harrow will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

In a harrow structure, a frame having side bars provided with converging forward extensions, a tongue having the forward ends of the side bars engaging the same at a point intermediate its length, a forward supporting caster having a stem extending through an opening formed in the rear portion of said tongue, securing means carried by the tongue and engaging the stem of said caster to releasably hold the caster in a set position and to permit the caster to be vertically adjusted with relation to the frame, a U-axle journaled upon the frame adjacent the rear edge thereof and extending transversely of the frame and having its end portion formed into spindles, rear traction wheels journaled upon said spindles, means for rotating said axle to adjust the rear traction wheels vertically with relation to the frame and releasably hold the frame in an adjusted position, and earth working means carried by the frame, the adjustability of the forward caster and rear traction wheels permitting the earth working means to be held in the desired relation to the ground.

In testimony whereof I affix my signature in presence of two witnesses.

VIGGO FOGH.

Witnesses:
CHARLES J. LENTSCHER,
TOM BERSIE.